United States Patent

[11] 3,597,678

| [72] | Inventor | Robert E. Fearon<br>Tulsa, Okla. |
|---|---|---|
| [21] | Appl. No. | 786,657 |
| [22] | Filed | Dec. 24, 1968 |
| [45] | Patented | Aug. 3, 1971 |
| [73] | Assignee | Williams Brothers Company<br>Tulsa, Okla. |

[54] APPARATUS FOR SENSING THICKNESS VARIATIONS, DISCONTINUITIES, AND THE LIKE IN ELONGATED STEEL STRUCTURES BY MEASURING VARIATIONS IN MAGNETIC PROPERTIES UTILIZING A FLUX GATE
12 Claims, 4 Drawing Figs.

| [52] | U.S. Cl. | 324/37 |
|---|---|---|
| [51] | Int. Cl. | G01r 33/12 |
| [50] | Field of Search | 324/34, 37, 43, 47 |

[56] References Cited
UNITED STATES PATENTS

| 2,770,773 | 11/1956 | Cooley | 324/37 |
|---|---|---|---|
| 2,929,985 | 3/1960 | Havelka | 324/34 |
| 3,091,733 | 5/1963 | Fearon et al. | 324/37 |
| 3,218,547 | 11/1965 | Ling | 324/47 |
| 3,443,211 | 5/1969 | Wood et al. | 324/37 |

*Primary Examiner*—Rudolph V. Rolinec
*Assistant Examiner*—R. J. Corcoran
*Attorney*—Richards, Harris & Hubbard ABSTRACT: A ferromagnetic pipe section is magnetically energized parallel to its axis at a low frequency and flux intensity, and a subsection of the energized section is sensed circumferentially to generate a signal responsive to changes in the magnetic character of the pipe comprising the said subsection. The sensing apparatus includes an annularly shaped, axially outwardly facing channel containing a circumferentially wound sensing coil surrounded by a toroidal gating coil. Associated circuitry generates a signal indicative of changes in the magnetic character of the subsection of the pipe sensed.

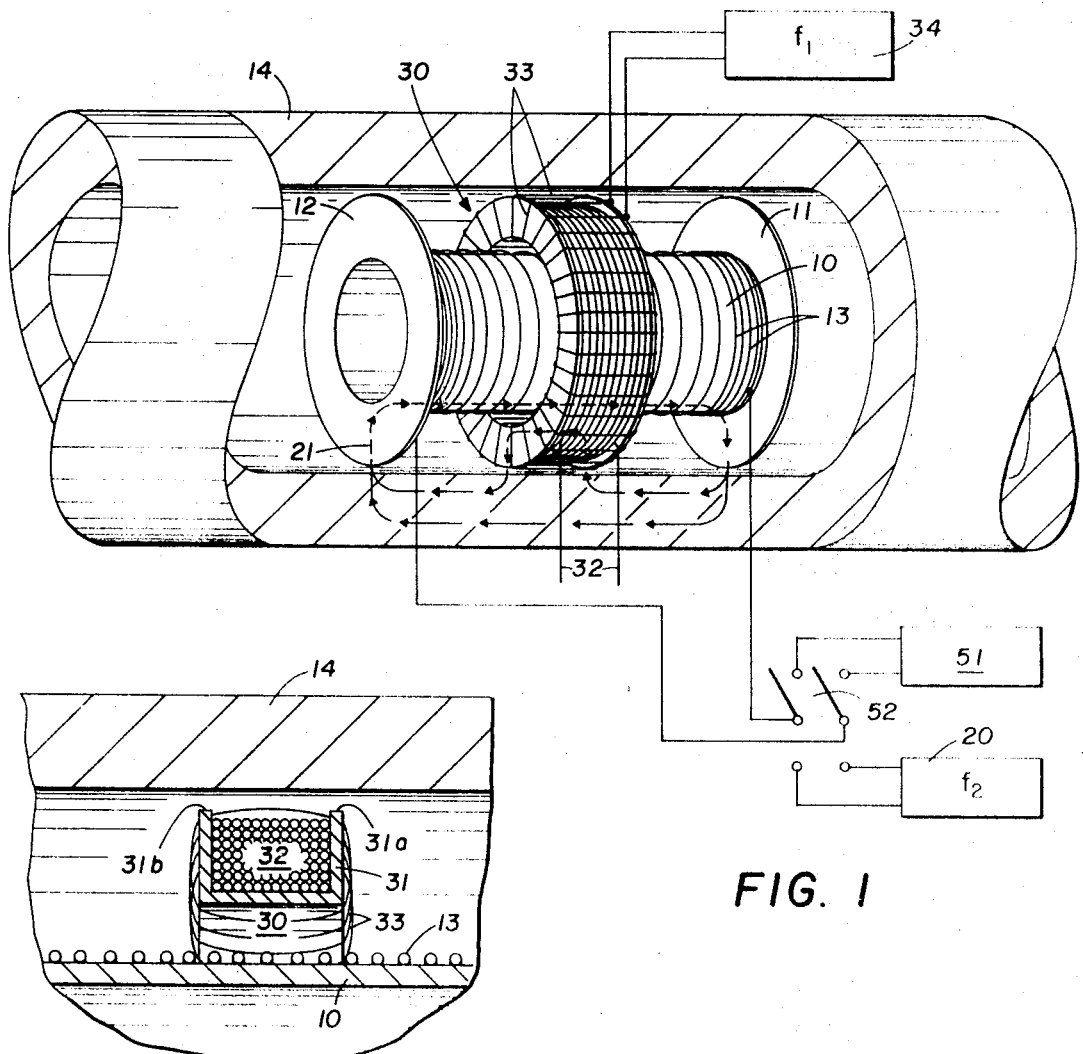
FIG. 1
FIG. 2
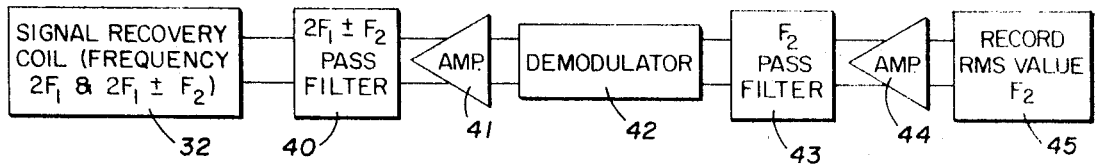
FIG. 3
INVENTOR
ROBERT E. FEARON
ATTORNEY

INVENTOR:
ROBERT E. FEARON

ATTORNEY

APPARATUS FOR SENSING THICKNESS VARIATIONS, DISCONTINUITIES, AND THE LIKE IN ELONGATED STEEL STRUCTURES BY MEASURING VARIATIONS IN MAGNETIC PROPERTIES UTILIZING A FLUX GATE

This invention relates to the magnetic inspection of pipes and, more particularly, to a unit which minimizes the strength of magnetic field necessary while magnetizing restricted annular portions of the pipe.

In U.S. Pat. No. 3,091,733, there is shown a magnetic measuring system wherein the relationship between a particular measurement and variations in thickness of the pipe is employed.

In U.S. Pat. No. 2,770,773 to Cooley, magnetic poles saturate or approximately saturate the pipe, with stray flux responsive means spaced along a line adjacent the pipe wall about midway of the saturating means.

It is not convenient nor advisable to employ the saturating means provided by Cooley for the reason that the magnetic flux required to saturate a pipe is very large. Further, the entry and escape of magnetic flux is so intense that substantial mechanical traction between the survey device and the pipe is produced. Further, as a result of the relatively strong magnetic fields occurring where the saturating flux enters and leaves the pipe, there is a tendency for magnetizable detritus to accumulate and lodge between the survey tool and pipe wall. Such accumulations cause the survey tool to get stuck.

The present invention relates to a system for measurement somewhat related to that disclosed by Cooley, while avoiding an extremely strong magnetic flux employed by Cooley. Thus, substantial traction forces and the accumulation of magnetizable detritus are avoided.

In accordance with this invention, an alternating magnetic flux at frequency $f_2$ and of moderate intensity is imposed so as to include the portion of the pipe wall being tested. A magnetic field sensing device is of a special nature and does not require a scanning shoe as provided by Cooley. Instead, a stationary device sensitive around the whole perimeter of the pipe being surveyed is employed. Thus, by different choices of the magnetic measurements to be made, a more completely accurate representation of thickness can be had, one which is relatively independent of disturbing effects.

In U.S. Pat. No. 2,770,773 the saturation flux, which a portion of the pipe carries, is considered to be constant. Therefore, a thin place in a pipe will be a point at which magnetic flux must leave the pipe material. This is detected by a scanner, if the adjacent portions of the steel are substantially saturated. In the present invention, it is assumed that the magnetic reluctance of a portion of the pipe where the thinning occurs is the same for a specimen of equal dimensions derived from the thin portions, as it is for the specimens of the same dimensions at the thicker portions of the pipe. It is assumed that the magnetic quality of steel in the pipe, as produced in a pipe mill, is substantially constant, and not qualitatively different where there are thin places, or at least such differences, if any, are small compared with changes due to thinning, cracks or the like.

In accordance with the present invention, there is provided a method of pipeline inspection in which, over a limited section of the pipe, a longitudinal, circumferentially distributed, alternating magnetic flux is energized parallel to the pipe axis at a level below saturation and at a low frequency. A diversion path for a fraction of the flux thus established is provided by shunting a limited longitudinal subsection of the energized section. An alternating magnetic flux is then provided in the diversion path at high frequency sufficient periodically to drive the diversion path into a nonlinear magnetization region. A signal at the low frequency is then produced which is representative of the modulation product resulting from the envelope of the high frequency signals caused by the periodic nonlinear magnetization of the diversion path.

In a further aspect, a system is provided wherein a detector, shunting a limited length of piping over its entire circumference, is provided with a toroidal excitation coil and a circular detecting coil. A source of alternating current is provided for periodically driving the magnetization of the detector structure at least into a nonlinear magnetization region. Means are provided, responsive to signals induced in the sensing coil, for generating an output signal.

For further understanding of the present invention and for further advantages thereof, reference may now be had to the following description taken in conjunction with the accompanying drawings in which:

FIG. 1 illustrates one embodiment of the present invention positioned inside a pipeline;

FIG. 2 is a sectional view of a portion of the system of FIG. 1 showing details of the detector;

FIG. 3 is a diagram of the signal-processing portion of the system; and

Figure 4:
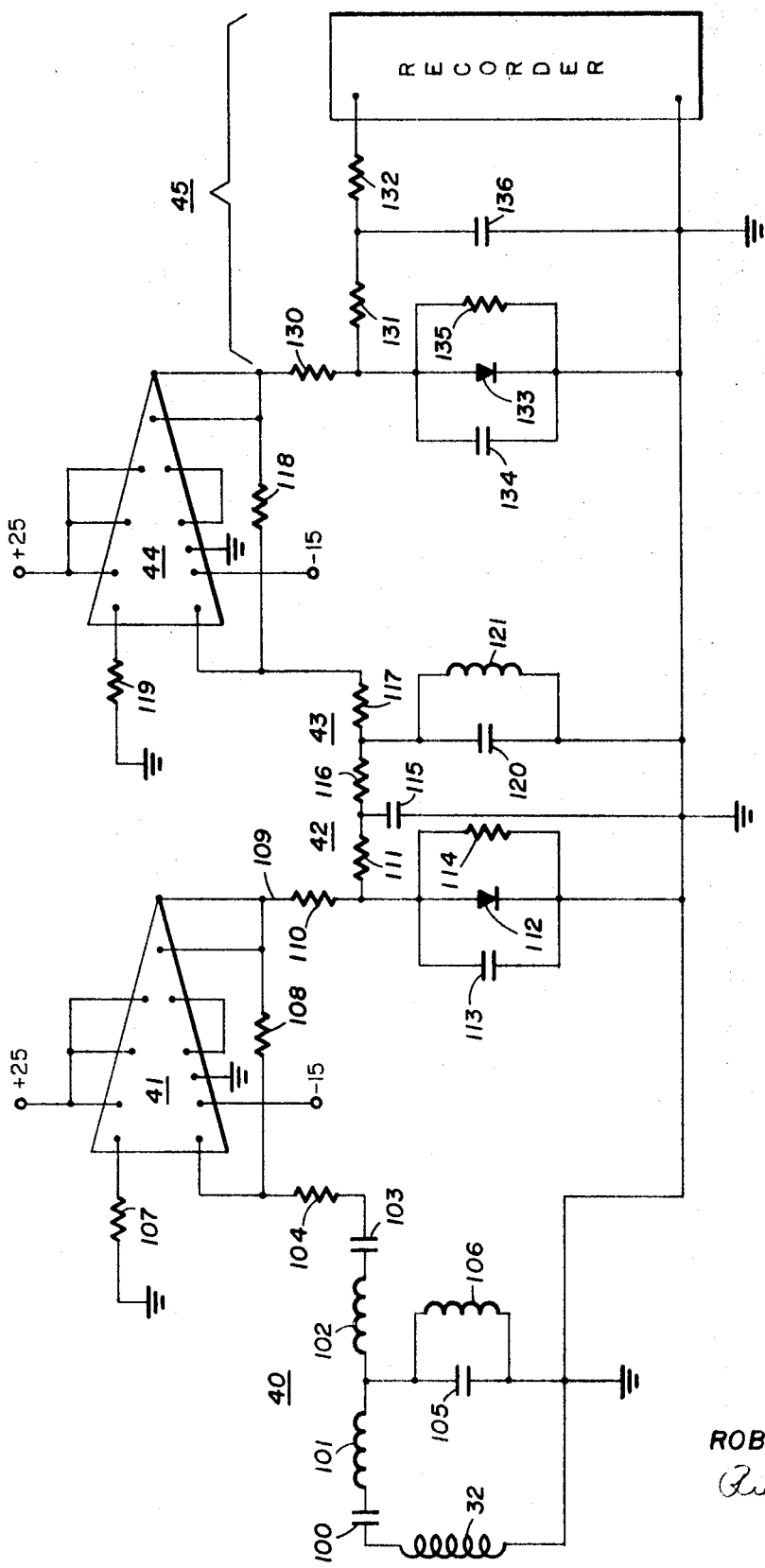
FIG. 4 is a more detailed circuit diagram of the system of FIG. 3.

In FIG. 1, one embodiment of a detector system according to this invention has been illustrated. It will be understood that the measuring system will be used as a part of a pipeline-instrumented pig system which travels through the pipe and which is of a type usually propelled by fluids traveling in the pipe. Such devices are well known and the present invention is directed to the features of the measuring system.

The system illustrated in FIG. 1 includes a magnetic structure in the form of a spool 10 having a cylindrical body section with end flanges 11 and 12. The spool 10 is of magnetizable material and is provided with a winding 13. As illustrated, the winding 13 is distributed over the length of the spool. The spool is of a ferromagnetic material preferably of high permeability. The diameter of the disks 11 and 12 is smaller than the inside diameter of the pipe 14 so that measuring system can pass through the pipe without being lodged on obstructions. The winding 13 is energized by alternating current of low frequency $f_2$ from a source 20. The magnetic flux which is produced in the spool 10 by current flow at frequency $f_2$ through winding 13 will then traverse a flux path 21 shown dotted. This is an alternating flux so that the direction of flux will periodically reverse. The magnetic field is preferably of relatively low magnitude, preferably well below saturation of the material in pipe 14.

A detector unit depending on nonlinear magnetization encircles the spool 10 at a center portion thereof. As also is shown in FIG. 2, the detector 30 comprises an annular channel 31 of ferromagnetic material, preferably of thin stock such that it can be magnetically saturated. Channel 31 has an outwardly facing groove in which a detecting coil 32 is located, the windings of the coil being circumferential with respect to the detector 30 and, thus, with respect to the pipe 14. The detector 30 is provided with a toroidal excitation winding 33 (adapted to produce a magnetomotive force everywhere directed around the perimeter). The force field preferably is distributed over the entire circumference of the channel 31. The excitation winding 33 is energized at a frequency $f_1$ from a source 34. The frequency $f_1$ preferably is substantially higher than the frequency $f_2$.

The edges 31a and 31b of the detector channel 31 face the inner wall of the pipe 14 and thus form a shunt or diversion path for a portion of the flux of frequency $f_2$ which traverses path 21. More particularly, by reason of the close proximity of the edges 31a and 31b to the inner wall of the pipe, some of the flux at frequency $f_2$ will thus traverse the channel 31, effectively shunting at least a portion of the flux from the pipe 14.

Excitation current at frequency $f_1$ from unit 34 periodically drives the detector channel 31 into a nonlinear region of the B-H curve of the channel 31. As a result, the signal induced in coil 32 induces components $2f_1$ and $2f_1 \pm f_2$. This signal is then processed in order to produce an output signal at frequency $f_2$ which is the demodulation product and is proportional is magnitude to the flux which was diverted. Changes in this flux produced by changes in dimension through thinning or cracks having components thereof which are transverse to the axis of the pipeline will then be reflected by changes in the amount of flux diverted. By utilizing a detector which is annular in character, the flux in the pipe over the sections spanned by the flanges 31a and 31b of the detector effectively is integrated over the entire circumference of the pipe. Any change in magnetic character of the pipe will thus be reflected in the integration product which is the signal extracted at frequency $2f_1 \pm f_2$ from the current flowing in detector coil 32.

Referring now to FIG. 3, the detector 32 is illustrated diagrammatically as connected to a filter 40 which passes the component ($2f_1 \pm f_2$). The output of filter 40 is then applied by way of an amplifier 41 to a demodulator 42. The demodulator 42 then produces an output signal which includes the signal $f_2$. The output signal is applied to a filter 43 constructed to pass only signals at frequency $f_2$. The output of the filter 43 is then applied by way of amplifier 44 to a recorder 45 which records preferably the RMS values of the signal.

The recorder, filters, amplifiers and demodulation system, and the excitation sources 20 and 34 are self-contained in the unit which travels through the pipeline.

In this system, the length of the spool 10 will be preferably about two pipe diameters. The diameter of the center portion of the spool will be of the order of about one-half the pipe diameter. The dimensions of the flanges 11 and 12 will be made as great as possible, taking into consideration the fact that the unit must move through the pipeline and undue thickness will increase the weight and thus the traction problem. The system should minimize reluctance in that portion of the path represented by the gap between the disks and the pipeline walls while accommodating movement through the pipe.

A flux density in the pipe wall of the order of 100—400 lines per square centimeter represents a satisfactory level for operation in accordance with the present invention.

The detector channel 31 employed in the present invention preferably is an extremely thin-walled, readily saturable annular outwardly facing channel. The materials preferably employed are such as manufactured by Allegheny Ludlum Steel Company and sold by Arnold Engineering Company of Morengo, Illinois, under the trade name DELTA MAX or, as offered by Magnetics, Inc. of Butler, Pennsylvania under the trade name PERMALOY 49. These alloys are composed of iron, nickel, and molybdenum in various proportions, and are made serviceable for magnetic use by heating to approximately 2,000° F. and cooling slowly in an atmosphere of pure hydrogen.

The thickness of the material forming channel 31 will be dependent upon the dimensions of the pipe 14, the width of the channel 31, the power available for producing the excitation currents, and the frequency of the excitation currents. The edges 31a and 31b of channel 31 in general will be spaced a given distance from the inner wall of the pipe 14. The axial length of the channel 31 preferably is at least equal to twice such spacing. An axial length equal to or less than such spacing is not preferred because it approaches a condition where the flux in path 21 would not be diverted from the pipe 14 into the detector channel 31.

In one embodiment of the system, the frequency $f_2$ was of the order of 10 cycles, the choice of frequency depending upon the thickness of the pipe 14, the choice being dictated by the desire to have the flux distribute itself throughout the entire wall thickness of the pipe. Higher frequencies could be employed if the measurement is limited to the physical characteristics of the inner wall of the pipe.

The frequency $f_1$ in one embodiment is preferably of the order of 2,000 cycles per second and of such magnitude as to saturate the material forming channel 31 or at least drive the magnetization therein into the nonlinear portion of the characteristic magnetization curve.

In FIG. 4, the system of FIG. 3 has been set forth in greater detail. The coil 32 has been illustrated as connected to filter 40, comprising inductances 101, 102 and 106 and capacitors 100, 103 and 105. The filter is coupled through the resistance 104 to the input terminal of amplifier 41.

The amplifier 41 is of the type manufactured and sold by Radiation Inc., Microelectronics Division, 600 Old Orchard Road, Garden City, New York, and identified as Model No. RA-238, RA-239 or RA-240, preferably operating at a gain of about 100. A shunt resistor 108 is connected between the input terminal and the output terminal, the output line 109 leading to a demodulator which includes resistances 110 and 111, the juncture between which is connected with a shunt arm including a rectifier 112, capacitor 113 and resistance 114. The other input terminal of the amplifier 41 is grounded by way of resistor 107. The junction between resistors 111 and 116 are connected to ground by way of capacitor 115. The demodulator output is supplied by way of resistance 117 to the input of the second amplifier 44 which may be the same as amplifier 41. A shunt resistor 118 is connected between the input terminal and the output terminal. The other input terminal is grounded by way of resistor 119. The juncture between resistances 116 and 117 is connected to ground by way of a parallel shunt circuit including capacitor 120 and inductance 121, thus far completing the $f_2$ filter 43.

The output of the amplifier 44 is connected by way of a rectifier filter circuit to the input terminals of the recorder unit. The circuit 45 develops the RMS value of the output of amplifier 44. The circuit includes resistors 130, 131 and 132 connected in series between the output of amplifier 44 and the input of the recorder unit. The juncture between resistors 130 and 131 is connected to ground by way of a circuit including a rectifier 133 paralleled by capacitor 134 and resistance 135. The juncture between resistors 131 and 132 is connected to ground by way of capacitor 136.

From passband filter theory it will be readily recognized that the frequency $f_2$ is a function of the ratio of $L_{101}/L_{106}$. $L_{101}$ equals $L_{102}$.

Further, in the amplifier 41 the gain at the center of the pass band may be expressed in terms of gain $= -r_{108}/(r_{104}+r_f)$, where $r_f$ is the resistive component of filter 40 as seen from the lower terminal of resistance 104.

The output of amplifier 41 is a modulated signal which is applied to demodulator 42, the output of which is filtered by filter 43 and applied to amplifier 44. The output of the amplifier 44 is then demodulated again so as to be in the form of the RMS value of the AC signal from the amplifier 44 for a recording on the DC recorder unit. The pass filter 43 is designed to pass the frequency of $f_2$ and is constructed such that the following expression is satisfied: $\omega L_{121} = (1/\omega C_{120}) > R_{117}$ From the foregoing it will be seen that not only is there provided a unique system for investigating the characteristics of the pipeline wherein an alternating magnetic flux is produced in the pipeline and selectively shunted, but, also, there is provided a unique pipeline flux detector. The system of FIG. 1 could, therefore, be useful if the lines from the coil 13 leading to oscillator 20 were switched as by means of switch 52 to a source 51 of unidirectional current. In this case, the annular integrating saturable flux detector provides an output signal of $2f_1$ which if demodulated or changed to RMS value provides an indication as to the change in the magnetic character of the pipeline wall. Further, it will now be seen that since the earth's field provides a magnetic flux in a pipeline which, under many circumstances is sufficient for carrying out the measurements provided herein, that the source 20 and source 51 may be eliminated if the operator so chooses, with reliance being placed upon the diversion of the earth's magnetic field throughout the detector 30 in order to sense changes in the character of the pipe.

The representation of the output as presented by the recorder 45 shown at the right hand of the diagram of FIG. 3, is a function of thickness which, approximately, is the reciprocal of the average thickness of an element of length of the pipe equal to the distance between the edges 31a and 31b of the spool 31, as shown in FIG. 2. The element of length as alluded to above is, in fact, a section between two plane surfaces, each perpendicular to the axis of the pipe, and separated from one another by the distance between edges 31a and 31b of the element 31 as shown in FIG. 2. Deviations from the reciprocal relationship approximation occur because of the nonlinear magnetization curve of the iron composing the pipe wall 14 as illustrated in FIG. 2. In keeping with the need for knowledge of the exact function that represents the output in response to variation in thickness of an otherwise magnetically uniform pipe; the output of the recorder 45, as illustrated in FIG. 3, is represented by a product of functions, one of which is the reciprocal of the thickness, the other function being a function of thickness and of magnetic properties of the steel and of the total number of magnetic lines passing parallel to the pipe axis. The second function is called herein the nonlinearity factor. If it is normalized to a value of 1 for small magnetic intensities, it may be assumed to be equal to 1 over the range of thicknesses ±20 percent, provided the flux intensities are restricted to the degree indicated previously in this description, to the vicinity of a few hundred lines per square centimeter. For a substantially larger intensity, or for very large deviations of thicknesses, the function becomes extremely nonlinear, and the assumption that it is equal to one is a poor approximation.

Having described the invention in connection with certain specific embodiments thereof, it is to be understood that further modifications may now suggest themselves to those skilled in the art and it is intended to cover such modifications as fall within the scope of the appended claims.

What I claim is:

1. Apparatus for determining the thickness of iron pipe which comprises:
   a. an electromagnet means having coaxial symmetry to the axis of said pipe for establishing a magnetic flux passing longitudinally through a length of the walls of said pipe,
   b. a circular magnetic shunt mounted coaxial to the axis of said electromagnet means spanning a central fraction of the pipe length through which said magnetic flux is passing and having means for cyclic time varying electromagnetic excitation thereof in a direction coaxial with said shunt, and
   c. means for sensing the axial portion of said magnetic flux passing through said shunt.

2. The combination set forth in claim 1 wherein means are provided for operation of said shunt as a flux gate.

3. The combination set forth in claim 1 wherein said shunt is an axially outwardly facing circular channel having flanges which are in juxtaposition to the inner wall of said pipe.

4. The combination set forth in claim 1 wherein said electromagnet means is of length about two diameters of said pipe, said shunt being centrally located thereon.

5. Apparatus for determining the magnetic variations in ferromagnetic pipe due to cracks, thinning or the like which comprises:
   a. an elongated magnetizable spool having a coil thereon and circular end flanges the peripheries of which face the inner wall of said pipe in two annular zones spaced apart along said pipe to establish upon energization a magnetic field in said pipe between said flanges which said magnetic field is below saturation,
   b. a short saturable magnetizable spool surrounding and spanning a central portion of said elongated spool and having a circumferential sensing coil thereon and a toroidal excitation coil,
   c. a source of alternating current coupled to said toroidal coil for energizing said toroidal coil to drive said short spool periodically toward saturation, and
   d. means coupled to said sensing coil operable in dependency upon the flux in said sensing coil to generate a signal representative of the flux in said short spool.

6. Apparatus for determining the thickness of ferromagnetic pipe which comprises:
   a. en electromagnet having symmetry to the axis of said pipe with spaced-apart, circular pole pieces the peripheries of which are facing the inner walls of said pipe,
   b. a detector structure having symmetry to the axis of said pipe with circular flux-receiving peripheral extremities facing the inner walls of said pipe and located between said pole pieces and having a toroidal excitation coil,
   c. a source of alternating current of low frequency for energizing said electromagnet,
   d. a source of alternating current of high frequency for energizing said toroidal coil, and
   e. means for sensing the component of the magnetic field in said detector structure having the low frequency.

7. Apparatus for determining the magnetic variations in ferromagnetic pipe due to cracks, thinning or the like which comprises:
   a. an elongated magnetizable spool having a coil thereon and circular end flanges the peripheries of which face the inner wall of said pipe in annular zones spaced along said pipe,
   b. a source of alternating current for energizing said coil at low frequency to establish a magnetic field in the pipe between said flanges which is below saturation,
   c. a short, magnetizable spool spanning a central portion of said elongated spool and having a circumferential sensing coil thereon and a toroidal excitation coil,
   d. a source of alternating current for energizing said toroidal coil at high frequency to drive said short spool periodically toward saturation, and
   e. means to detect a signal at said low frequency from the current induced in said sensing coil.

8. Apparatus for determining the thickness of ferromagnetic pipe where a magnetic flux passes longitudinally in the walls of said pipe, which comprises:
   a. an annular magnetic shunt, including an annular channel the peripheries of which face the pipe and having coaxial symmetry to the axis of said pipe, and spanning a short portion of the pipe length and having means for cyclic time varying electromagnetic excitation of said shunt in a circular direction coaxial with said shunt, and
   b. means coupled to said shunt for sensing the axial portion of said magnetic flux passing through said shunt.

9. Apparatus for determining the magnetic variations in ferromagnetic pipe due to cracks, thinning or the like where a magnetic field directed longitudinally in the walls of said pipe is below saturation which comprises:
   a. a short saturable magnetizable spool spanning a small portion of the length of said pipe and having a circumferential sensing coil thereon and a toroidal excitation coil,
   b. A source of alternating current for energizing said toroidal coil to drive said short spool periodically toward saturation, and
   c. means coupled to said sensing coil operable in dependence upon the flux in said sensing coil to generate a signal representative of the flux in said short spool.

10. Apparatus for measuring variations in magnetic properties of an elongated steel structure comprising:
    a. an electromagnetic means having coaxial symmetry with respect to an axis of said structure for establishing a magnetic flux passing longitudinally through a length of the elongated steel structure,
    b. a circular magnetic shunt mounted coaxial to the axis of said electromagnetic means and spanning a central fraction thereof and having means for cyclic time varying electromagnetic excitation thereof in a direction coaxial with said shunt, and
    c. means for sensing the axial portion of said magnetic flux passing through said shunt.

11. Apparatus for measuring variations in magnetic properties of an elongated steel structure as set forth in claim 10 wherein said electromagnetic means includes an elongated magnetizable spool having a coil thereon and circular end flanges the peripheries of which face outward from the axis of said spool.

12. Apparatus for measuring variations in magnetic properties of an elongated steel structure as set forth in claim 10 wherein said circular magnetic shunt includes a short saturable magnetizable spool surrounding and spanning a central portion of said elongated magnetizable spool and having a circumferential sensing coil thereon and a toroidal excitation coil.